United States Patent

Shokaku et al.

[11] Patent Number: 5,983,812
[45] Date of Patent: Nov. 16, 1999

[54] SEEDLING WITH SOIL SELECTING AND TRANSPORTING APPARATUS FOR TRANSPLANTING MACHINE

[75] Inventors: Michihiro Shokaku; Isao Mikawa, both of Hokkaido, Japan

[73] Assignee: Circle Tekko Co., Ltd., Hokkaido, Japan

[21] Appl. No.: 08/998,607

[22] Filed: Dec. 29, 1997

[30] Foreign Application Priority Data

Aug. 28, 1997 [JP] Japan .................................. 9-232727

[51] Int. Cl.[6] .................................................. A01C 11/00
[52] U.S. Cl. ........................................ 111/104; 111/100
[58] Field of Search .................................. 111/104, 105, 111/103, 100

[56] References Cited

U.S. PATENT DOCUMENTS

| | | | |
|---|---|---|---|
| 3,921,547 | 11/1975 | Etwell | 111/104 |
| 4,047,631 | 9/1977 | Diz | 111/104 X |
| 5,564,352 | 10/1996 | Kondo et al. | 111/104 |

FOREIGN PATENT DOCUMENTS

| | | | |
|---|---|---|---|
| 434035 | 9/1926 | Germany | 111/104 |
| 2-29843 | 8/1990 | Japan . | |
| 404141011 | 5/1992 | Japan | 111/104 |
| 405003711 | 1/1993 | Japan | 111/104 |
| 405015212 | 1/1993 | Japan | 111/104 |
| 405095707 | 4/1993 | Japan | 111/104 |
| 405095708 | 4/1993 | Japan | 111/104 |
| 1274639 | 12/1986 | U.S.S.R. | 111/104 |
| 092011746 | 7/1992 | WIPO | 111/104 |

*Primary Examiner*—Christopher J. Novosad
*Attorney, Agent, or Firm*—Sughrue, Mion, Zinn, Macpeak & Seas, PLLC

[57] ABSTRACT

A seedling with soil selecting and transporting apparatus for a transplanting machine which can steadily and certainly discriminate good seedlings with soil and no good seedlings with soil without causing operation failure by deposition of a clump of earth even if external vibration and/or slight disturbance is caused in transporting attitude of the seedling with soil. The seedling with soil selecting and transporting apparatus for a transplanting machine transports good seedlings having leaf portions grown into a normal length and no good seedlings having leaf portions not grown into a normal length. The apparatus comprises a strip form transporting belt transporting good and no good seedlings with soil in an attitude wherein they are fallen sideways and have concentrically mounted soil depositing portions on one outer side edge portion of the strip form transporting belt. A clamping belt clamps leaf portions of good seedlings with soil among the good and no good seedlings mounted on the strip form transporting belt. The strip form transporting belt has its one outer side edge deflected downwardly for slipping down only no good seedlings having leaf portions not clamped by the clamping belt.

27 Claims, 8 Drawing Sheets

PRIOR ART

SEEDLING WITH SOIL SELECTING AND TRANSPORTING APPARATUS FOR TRANSPLANTING MACHINE

BACKGROUND OF THE INVENTION

1. Field of the Invention

The present invention relates generally to a seedling with soil selecting and transporting apparatus for a transplanting machine which automatically transplants seedlings with soil to a farm field. The seedlings with soil may be paper potted seedlings grown in a cardboard tube, or potted seedlings grown in a pot or a tray, for example. More specifically, the invention relates to a seedling with soil selecting and transporting apparatus for a transplanting machine which can select good seedlings with soil having leaf portions grown to a normal length, and no good seedlings with soil having leaf portions not grown to the normal length or having no leaf.

2. Description of the Related Art

Japanese Examined Utility Model Publication No. 2-29843 discloses a seedling with soil selecting and transporting apparatus for a transplanting machine of the type set forth above.

Figure 7:
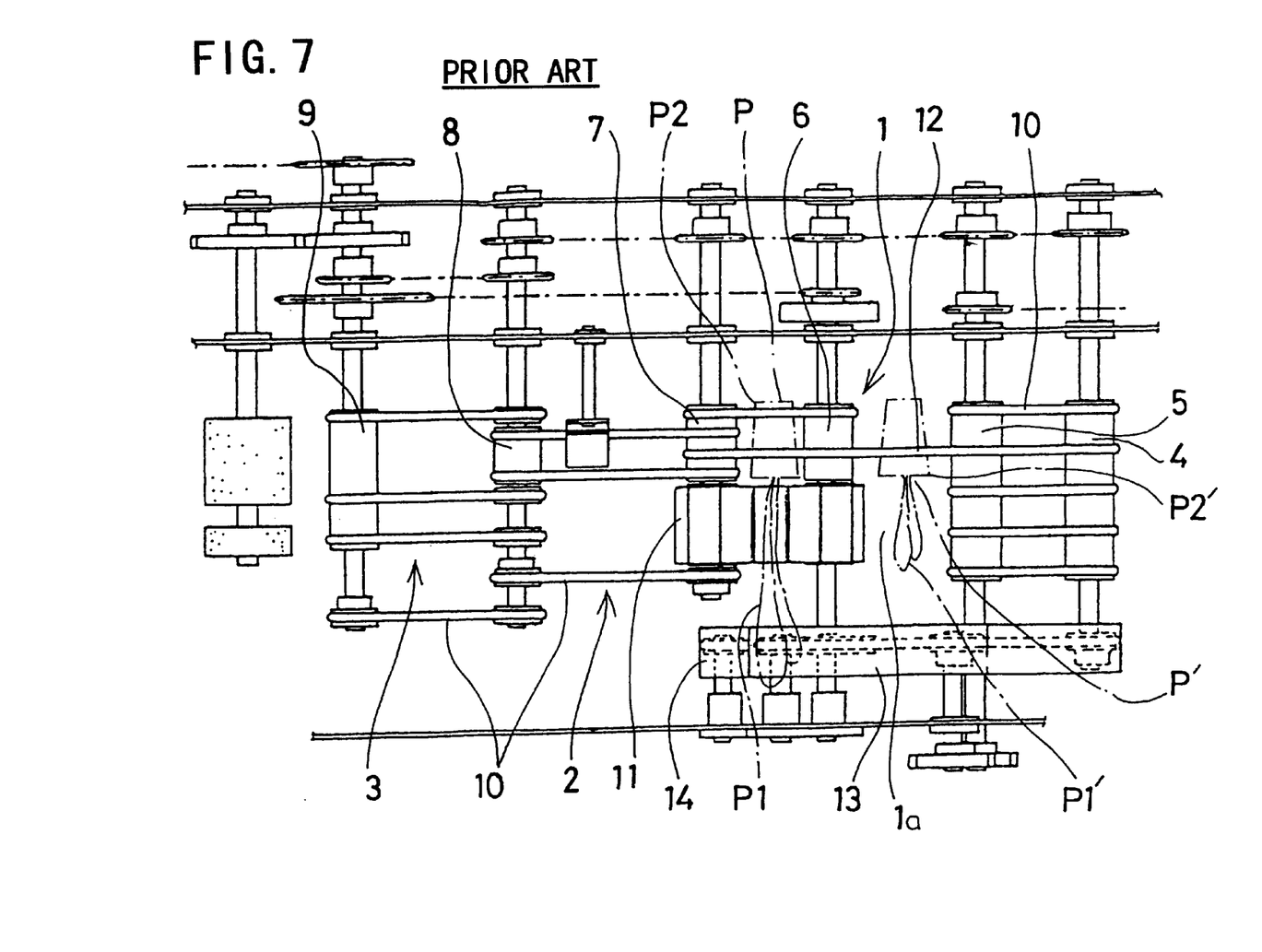
FIG. 7 is a plan view showing the major portion of the conventional seedling with soil selecting and transporting apparatus.

FIG. 7 shows the seedling with soil selecting and transporting apparatus for the transplanting machine disclosed in the above-identified publication. As shown in FIG. 7, arbitrarily arranged along a transport path are a seedling selecting and transporting conveyer 1 for selecting good paper potted seedlings P having leaf portions P1 grown to a normal length, and no good paper potted seedlings P' having leaf portions P1' not grown to the normal length, a seedling supply conveyer supplying the good and no good paper potted seedlings P and P' to the seedling selecting and transporting conveyer 1, a transporting conveyer 2, and a seedling aligning and transporting conveyer 3 transporting the selected good paper potted seedlings P to a seedling planting mechanism.

Each of the foregoing conveyers 1 to 3 is constructed by stretching a plurality of round string belts 10 between parallel pulleys 4 to 9. In addition to the pulleys and round string belts, the seedling selecting and transporting conveyer 1 includes a belt 11 with a wing strip, one strip form belt 12 mounting soil depositing portions P2, P2' of the good and no good paper potted seedlings P and P', and a pair of wide belts 13 and 14 arranged for clamping, from the upper and lower sides thereof, only leaf portions P1 of the good paper potted seedlings P, namely the leaf portions P1 grown to the normal length.

Figure 8:
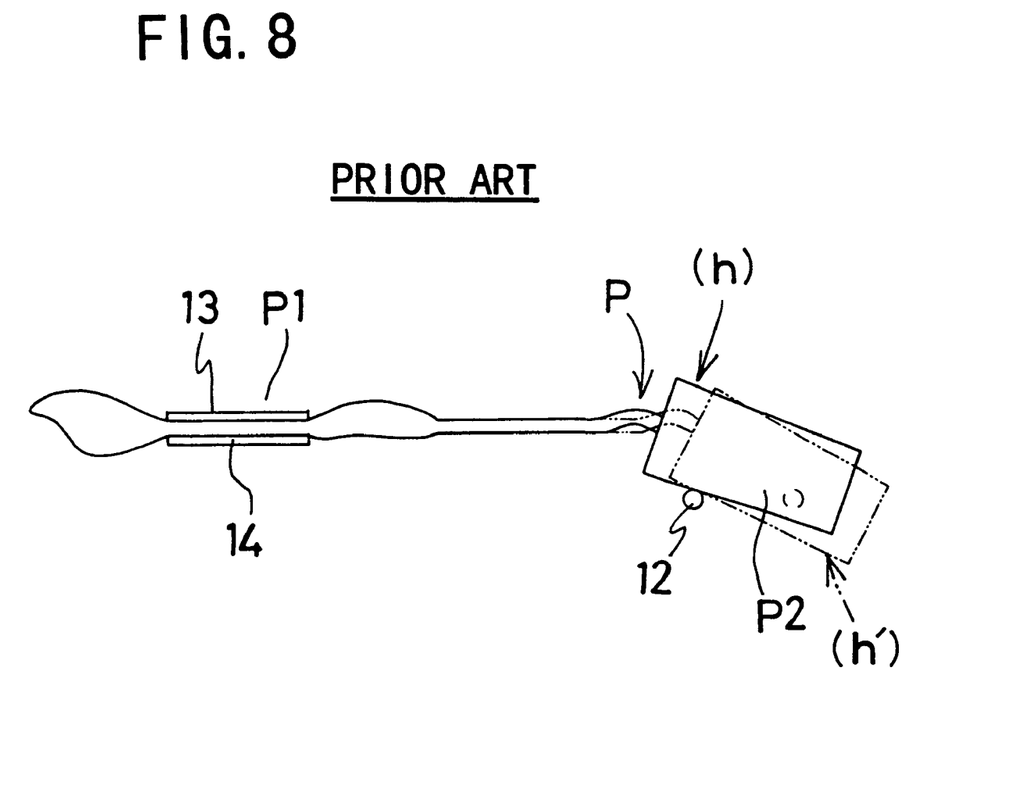
FIG. 8 is an explanatory illustration showing operation of selection of the seedling with soil by the conventional seedling with soil selecting and transporting apparatus.

Selection of the good paper potted seedlings P and the no good paper potted seedlings P' by the seedling selecting and transporting conveyer 1 is performed by mounting the soil depositing portions P2 and P2' of the good paper potted seedlings P and the no good paper potted seedlings P' on one strip form belt 12, as shown in FIG. 8.

Namely, when a paper potted seedling transported is a good paper potted seedling P, it is transported in the condition wherein it is fallen sideways with its leaf portion clamped by a pair of upper and lower wide belts 13 and 14. On the other hand, when a paper potted seedling transported is a no good paper potted seedling P', it falls down into a hollow space 1a since the wide belts 13 and 14 cannot clamp the leaf portion.

However, the conventional seedling with soil selecting and transporting apparatus is constructed by exposing the pulleys 4, to 9, around which the round string belts 10 and the belt 11 with the wing strip are mounted. With such an arrangement, a clump of earth may deposit on the pulley thereby easily causing the round string belts to move off the pulleys. Furthermore, since each of the conveyers 1 to 3 are formed by a combination of the pulleys and the round string belts, construction is complicated.

Also, in the seedling selecting and transporting conveyer 1, selective transportation is performed in the condition wherein the seedling is fallen sideways with the soil depositing portion mounted on one strip form belt 12 and the leaf portion P1 of the good paper potted seedling P clamped by the wide belts 13 and 14. With such an arrangement, balance may be easily destroyed even by slight offset of the position of the soil depositing portion P2 mounted on the strip form belt 12. For example, even by vibration associated with traveling of the transporting machine, the soil depositing portion P2 may slip off the strip form belt 12 thereby placing the seedling in an outwardly drooped condition. Furthermore, the tendency to destroy balance becomes higher for shorter length of the soil depositing portion P2.

In the condition where the soil depositing portion P2 droops outwardly from the strip form belt 12, a good paper potted seedling P is still transported with its the leaf portion P1 clamped between the wide belts 13 and 14. Therefore, when a good paper potted seedling P is transferred from the seedling selecting and transporting conveyer 1 to the transfer conveyer 2, the drooping soil depositing portion P2 collides with the pulley 6, or the like, of the transfer conveyer 2 to potentially cause difficulty in transfer to the transfer conveyer 2.

Furthermore, even when the good paper potted seedlings P having a dropping soil deposition portion P2 can be transferred to the transfer conveyer 2, the soil depositing portion P2 may collide on the pulley 6, or the like of the transfer conveyer 2 thereby causing delay of the transfer timing of the soil depositing portion P2 from the transfer timing of the leaf portion P1. In other words, the leaf portion P1 of a good paper potted seedling P is transferred in an attitude wherein its leaf portion is tilted toward the downstream side in the transporting direction in relation to its soil depositing portion P2. Thus, the good paper potted seedling P contacts with other good paper potted seedlings transferred preceding and following the objective good paper potted seedling thereby possibly disturbing alignment. This results in a difficult transplanting operation.

SUMMARY OF THE INVENTION

Therefore, it is an object of the present invention to provide a seedling with soil selecting and transporting apparatus, for a transplanting machine, which can steadily and certainly discriminate good seedlings with soil and no good seedlings with soil without causing operation failure by deposition of a clump of earth even if external vibration and/or a slight disturbance in the transporting attitude of the seedling with soil. Moreover, the above is achieved with a device having a simple construction.

According to one aspect of the invention, a seedling with soil selecting and transporting apparatus, for a transplanting machine, for transporting good seedlings having leaf portions grown into a normal length and no good seedlings having leaf portions not grown into a normal length, comprises:

a strip form transporting belt transporting good and no good seedlings with soil in an attitude wherein they are fallen sideways with their concentrically mounted soil depositing portions on one outer side edge portion; and a clamping belt for clamping leaf portions of good seedlings with soil, among the good and no good seedlings mounted on the strip form transporting belt, the strip form transporting belt having one outer side edge deflected downwardly for slipping down only no good seedlings having leaf portions not clamped by the clamping belt.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other words, well-known structures are not shown in detail in order to avoid unnecessarily obscuring the present invention.

Figure 1:
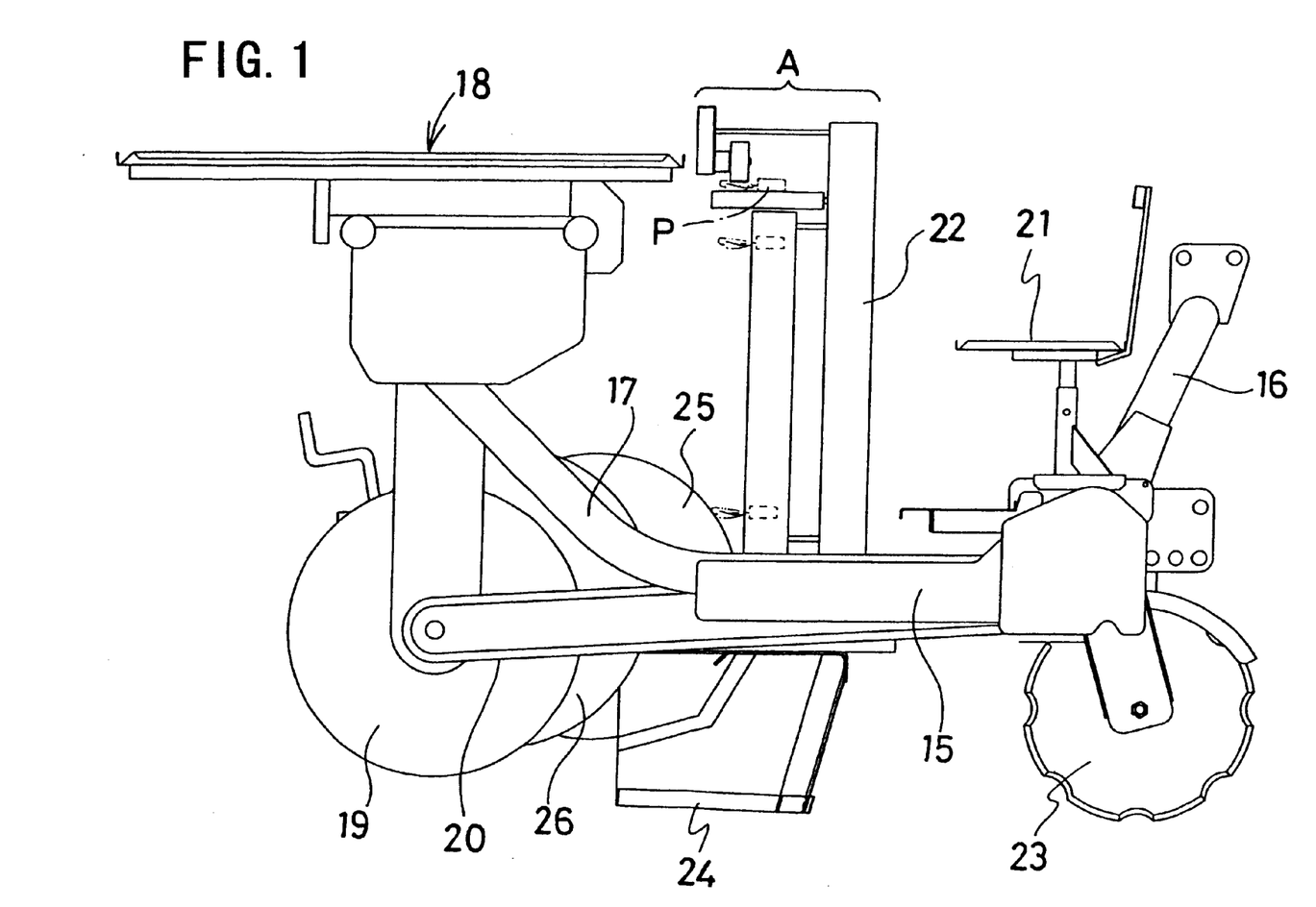
FIG. 1 is a side elevation of a transplanting machine, which includes the first embodiment of a seedling with soil selecting and transporting apparatus according to the present invention.
Figure 2:
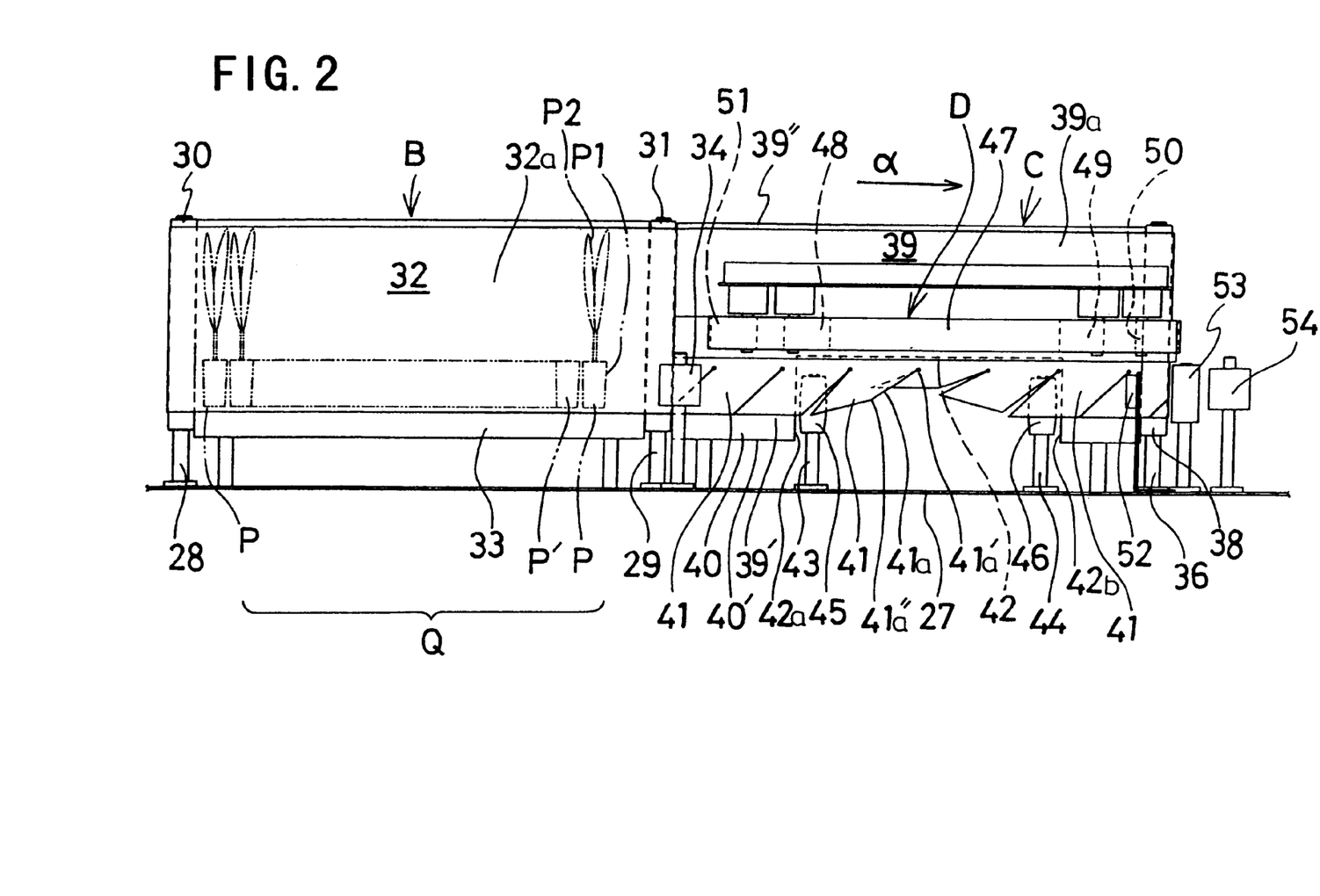
FIG. 2 is an enlarged plan view of the first embodiment of the seedling with soil selecting and transporting apparatus.
Figure 3:
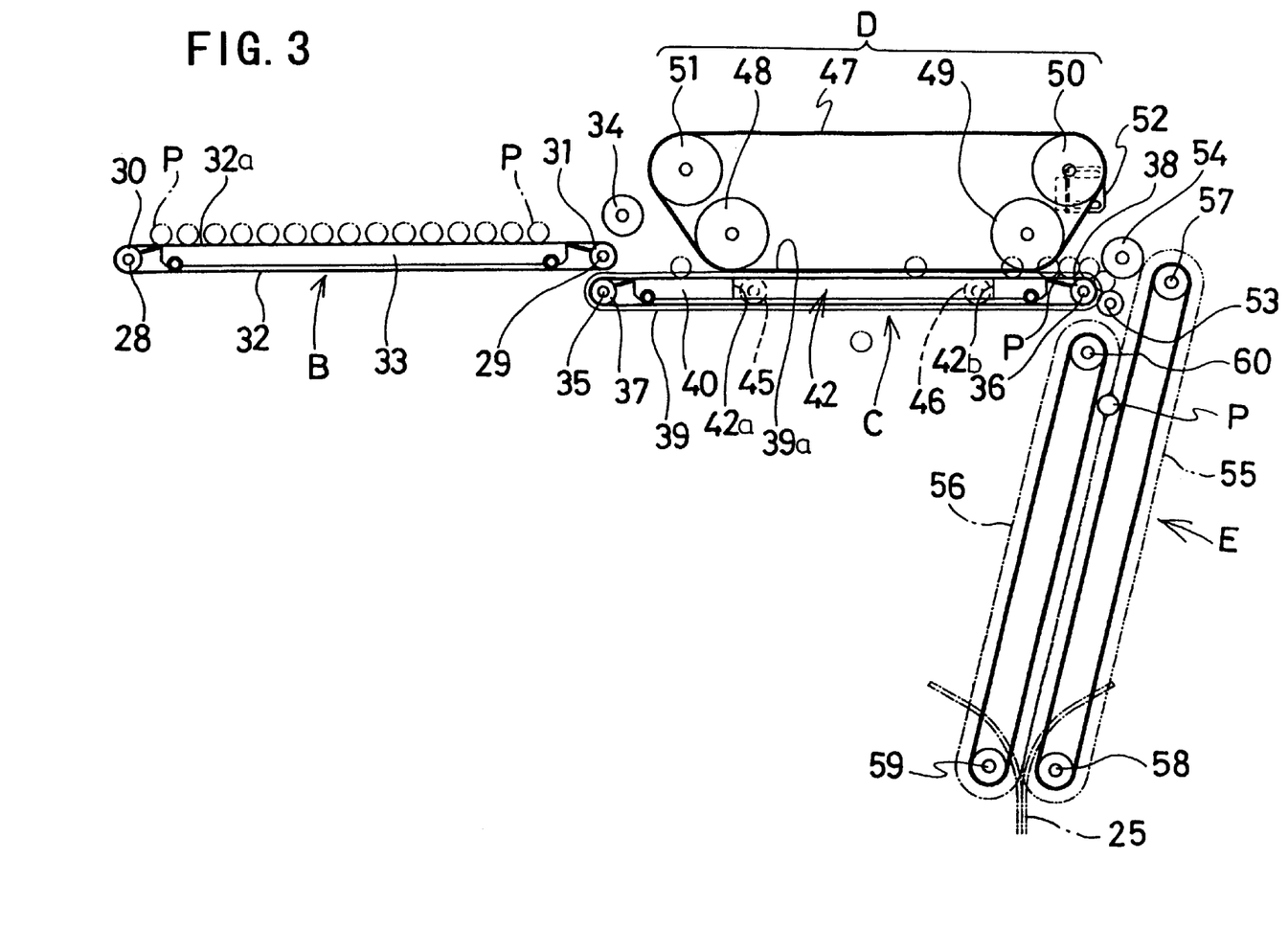
FIG. 3 is an enlarged front elevation of the first embodiment of the seedling with soil selecting and transporting apparatus according to the invention.

FIG. 1 is a side elevation of a transplanting machine, including the first embodiment of a seedling with soil selecting and transporting apparatus according to the present invention. FIG. 2 is an enlarged plan view of the first embodiment of the seedling with soil selecting and transporting apparatus, whereas FIG. 3 is an enlarged front elevation of the first embodiment of the seedling with soil selecting and transporting apparatus according to the invention.

The reference numeral 15 denotes a main frame of a transplanting machine, 16 denotes a front frame mounted on the front end portion of the main frame, and 17 denotes a movable frame mounted for vertical pivotal movement about the front frame 16.

On the rear end portion of the movable frame 17 is mounted a seedling base 18. On seedling base 18 is located a seedling with soil group including good and no good seedlings with soil. The seedlings with soil include paper potted seedlings, potted seedlings, and the like. A driving wheel 19 is mounted on the lower portion of the movable frame 17. The reference numeral 20 denotes a chain transmitting a driving force to the driving wheel 19. It should be noted that, on the seedling base 18, is mounted a seedling tray in which a plurality of cells for receiving the good and no good seedlings with soil P and P' are formed.

On the end portion of the front frame 16, a seat 21 for an operator is rigidly secured. In opposition to the seat 21 is mounted a seedling with soil selecting and transporting apparatus A according to the present invention. The selecting and transporting apparatus A selects and transfers the good and no good seedlings with soil P and P' taken from the seedling base 18. Also, a driving mechanism 22 supporting the seedling with soil selecting and transporting apparatus A is vertically provided on the intermediate portion of the movable frame 17.

In the movable frame 17, a rolling coulter 23, an opener 24, a planting unit 25 and a press down wheel 26 pressing down the implanted good seedling with soil P are arranged in sequential order from the front end portion to the rear portion.

The construction of the seedling with soil selecting and transporting apparatus A is as follows.

The reference sign B denotes a seedling supply conveyer. The seedling supply conveyer B is constructed by stretching a predetermined width of strip form supply belt 32 between a pair of belt stretching rollers 30 and 31 mounted on shafts 28 and 29 supported on one end portion and an intermediate portion of a machine frame 27.

On the seedling supply conveyer B, a plurality of seedlings with soil form a train Q, in which good and no good seedlings with soil P and P' are present. The seedlings P and P' are mounted on the strip form supply belt 32 such that they are fallen sideways for transportation toward the seedling with soil selecting and transporting conveyer C which is arranged at the downstream end of the strip form supply belt 32.

The reference numeral 33 denotes a belt holding plate arranged between the belt stretching rollers 30 and 31. The belt holding plate 33 holds the lower side of the strip form supply belt 32 so that the upper traveling portion 32a of the strip form supply belt 32 maintains a flat surface. Reference numeral 34 denotes seedling clamping rollers rotatably supported above the downstream end of the strip form supply belt 32.

The good and no good seedlings with soil P and P' transported by the strip form supply belt 32 are transferred to the seedling with soil selecting and transporting conveyer C while being clamped by the seedling clamping rollers 34.

The seedling with soil selecting and transporting conveyer C is constructed by stretching strip form transporting belt 39 between a pair of belt stretching rollers 37 and 38. The strip form transporting belt 39 may be made of an elastic member, such as rubber and so forth, for example. The strip form transporting belt 39 has the same width as the strip form supply conveyer 32 of the seedling supply conveyer B. The pair of belt stretching rollers 37 and 38 are mounted on shafts 35 and 36, respectively, supported on the machine frame 27.

The shaft 35 mounting the belt stretching roller 37 is arranged below the shaft mounting the belt stretching roller 31 of the seedling supply conveyer B. On the other hand, the shaft 36 mounting the belt stretching roller 38 is arranged on the upper end of an inlet to a seedling transporting conveyer E which will be discussed later.

Between the pair of belt stretching rollers 37 and 38, a belt holding plate 40 is arranged adjacent a lower side of the strip form transporting belt 39 for supporting the upper traveling portion 39a thereof so that the upper traveling portion 39a can be maintained as a flat surface.

Between the outer side edge portions 39' and 39" of the strip form transporting belt 39 are located a plurality of seedling with soil slip down pieces 41 which are sized for mounting the soil depositing portions P2 and P2' of the good and no good seedlings with soil P and P'. The slip down pieces 41 are formed in alignment on one of the outer side edge portions 39'.

Each of the seedling with soil slip down pieces 41 is formed on one of the outer edge portions 39' of the strip form transporting belt 39 so as to have a front side end edge 41a in the traveling direction α of the strip form transporting belt 39. The front side end edge 41a is formed so that a base end portion 41a' is inclined frontwardly from an outer end portion 41a" in the traveling direction α. With such construction, the seedling with soil slip down piece 41 is gradually deflected toward the outer end portion 41a" from the base end portion 41a' of the front side edge 41a and is then wrapped around the belt stretching roller 38. Accordingly, an aligning roller 53, which will be discussed later, is arranged in the vicinity of the belt stretching roller 38 so that the strip form transporting belt 39 smoothly travels without contacting with the aligning roller 53.

The belt holding plate 40 is a plate form body of a rectangular shape in plan view. On the side of one edge 40' is formed a seedling dropping opening 42 having a channel shaped configuration in plan view.

In the seedling dropping opening 42, slip down piece supporting rollers 45 and 46 are mounted on shafts 43 and 44, supported on the machine frame 27, adjacent the inner sides of opposing end edge portions 42a and 42b.

Because of the above construction, the seedling with soil slip down piece 41 is obliquely downwardly deflected, due to its own weight, as it gradually shifts toward the seedling dropping opening 42, in the direction of travel of the strip form transporting belt 39, while being supported by the slip down piece supporting roller 45.

On the other hand, a seedling with soil slip down piece 41 which has shifted into the seedling dropping opening 42 and been deflected obliquely downward, is moved out of the seedling dropping opening 42 as it becomes supported by the slip down piece supporting roller 46, and in conjunction therewith, is gradually returned to a horizontal attitude supported by the belt holding plate 40.

It is also possible to design the seedling with soil slip down piece 41 so that it does not deflect downwardly by its own weight but so that it deflects only when the good and no good seedlings with soil P and P' are mounted thereon.

The reference sign D denotes a seedling clamping conveyer. Clamping belts 47 are located at a position for clamping only leaf portion P1 of the good seedlings with soil P grown to the normal length and in opposition to the upper traveling portion 39a of the strip form transporting belt 39. The clamping belts 47 are stretched over four belt stretching rollers 48 to 51 respectively arranged at peak positions of a trapezoidal shape in front elevation.

The reference numeral 52 denotes a contactless sensor arranged at a downstream end portion of the strip form transporting belt 39. The contactless sensor detects a crowding condition of the good seedlings with soil P on the strip form transporting belt. On the basis of the result of detection, traveling speeds of the strip form transporting belt 39 and the strip form supply belt 32 are adjusted via electromagnetic clutch, or the like, so that a proper number of good seedlings with soil P is constantly mounted on the strip form transporting belt 39.

The reference numerals 53 and 54 denote an aligning roller and a seedling holding roller, respectively, supported in front of the downstream end portion of the strip form transporting belt 39. The good seedlings with soil P are fed out from the downstream end portion are guided by both rollers 53 and 54 to the upper end portion of the seedling transferring conveyer E.

The seedling transferring conveyer E is constructed with a pair of transfer belts 55 and 56 and belt stretching rollers 57 to 60, around which the transfer belts 55 and 56 are stretched, for transferring the good seedlings with soil from out between the aligning roller 53 and the seedling holding roller 54 to the planting unit 25. The upper end of one transfer belt 55 is located in the vicinity of the downstream end portion of the strip form transporting belt 39 and in opposition thereto. A good seedling with soil P received on the upper end is transported downwardly and then clamped between the transfer belts 55 and 56. The good seedling with soil is then transferred toward the planting unit 25 in a condition clamped between the transfer belts 55 and 56.

Next, discussion will be given with respect to operation of the seedling with soil selecting and transporting apparatus constructed as set forth above.

The seedling with soil train Q including good and no good seedlings with soil P and P' mounted on the seedling supply conveyer B is pushed and transferred by seedling holding roller 34 arranged at the downstream end of the strip form supply belt 32.

These good and no good seedlings with soil P and P' are supplied to the transportation starting end of the strip form transporting belt 39 of the seedling with soil selecting and transporting conveyer C. The good and no good seedlings with soil P and P' are sequentially transported toward the seedling dropping opening 42 such that soil depositing portions P2 and P2' of the good and no good seedlings with soil P and P' are placed on the seedling with soil sliding down pieces 41 on one outer edge portion 39' of the strip form transporting belt 39.

Figure 4:
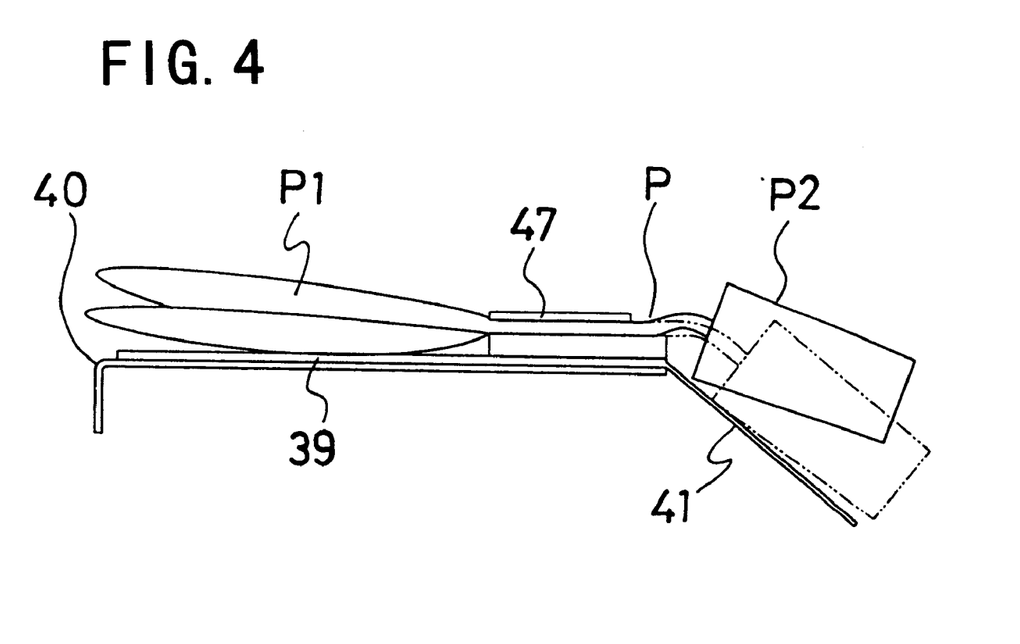
FIG. 4 is an explanatory illustration showing an operation for selecting good and no good seedlings with soil.

A good seedling with soil P has its leaf portion P1 clamped by the clamping belt 47 of the seedling clamping conveyer D and the strip form transporting belt 39 before reaching the seedling drop down opening 42. The good seedling with soil is then transported toward the seedling drop down opening 42 in the clamped condition.

On the other hand, a no good seedling with soil P' is transported toward the seedling drop down opening 42 without its leaf portion P' clamped by the clamping conveyer 47 of the seedling clamping conveyer D.

When the good and no good seedlings with soil P and P' reach the end edge 42a of the seedling drop down opening 42, the seedling with soil slip down pieces 41 start to downwardly and obliquely deflect due to their own weight and weight of the soil depositing portions P2 and P2' of the good and no good seedlings with soil P and P'.

According to increased magnitude of deflection of the seedling with soil slip down piece 41, a force acting downwardly perpendicular to the soil depositing portions P2 and P2' is increased. Then, the good and no good seedlings with soil P and P' are inclined to slip down along the seedling with soil slip down piece 41.

In this case, a good seedling with soil P has its leaf portion P1 clamped by the clamping belt 47 when in the seedling drop down opening 42 so that it does not drop into the seedling drop down opening 42. Therefore, the good seedling with soil P is transported to the transportation terminating end portion of the strip form transporting belt 39 without falling into the seedling drop down opening 42.

In contrast to this, the no good seedling with soil P' does not have a leaf portion P1' clamped by the clamping belt 47 so that it does drop down into the opening 42 by the force of the soil depositing portion P2' and is ejected to a path other than the transporting path for the good seedlings with soil P, namely out of the system. Thus, the good seedlings with soil P and the no good seedlings with soil P' can be selected.

Then, the selected good seedlings with soil P are supplied to the planting unit 25 via the seedling transfer conveyer E, and are sequentially implanted to the farm field.

Figure 5:
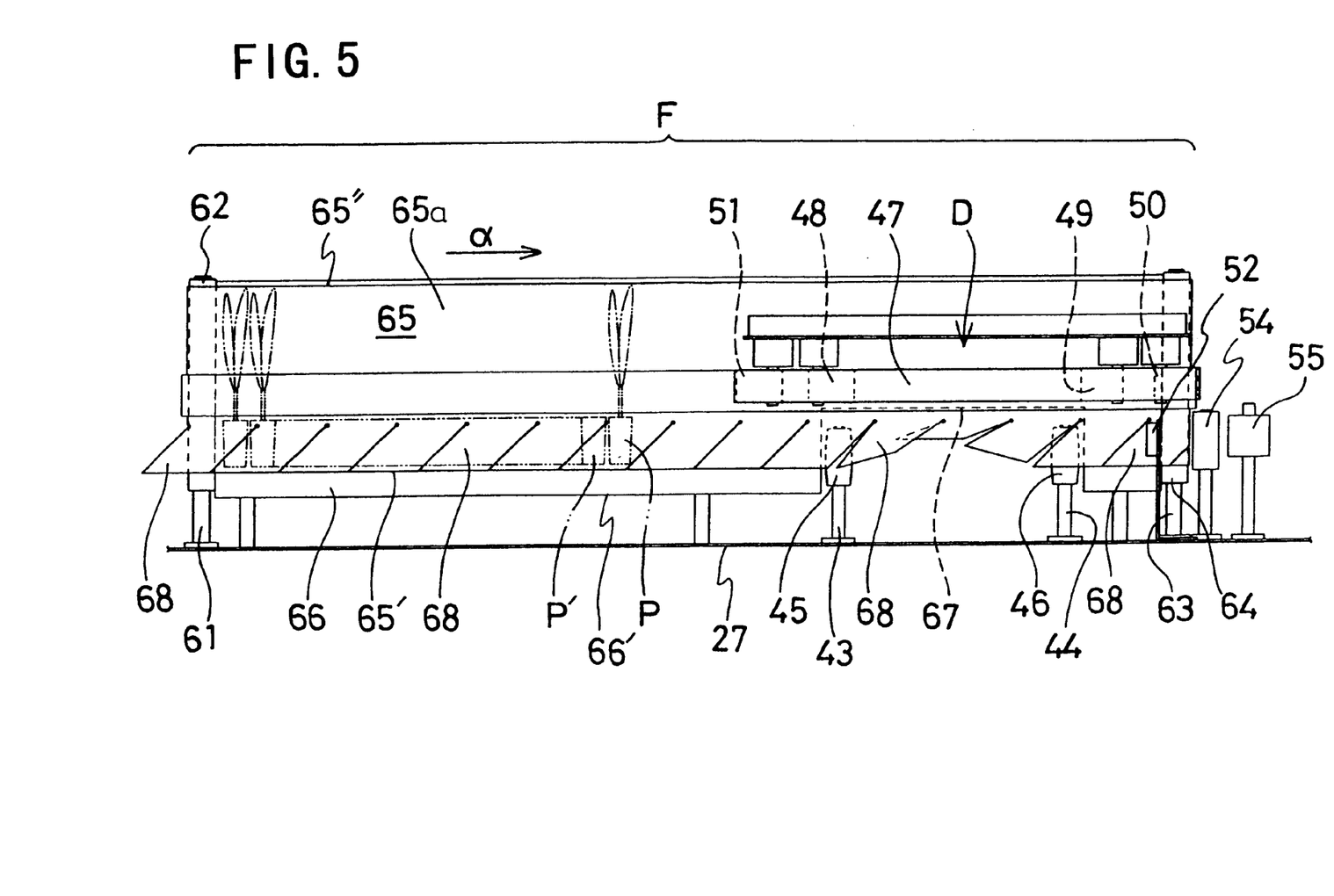
FIG. 5 is an enlarged plan view of the second embodiment of a seedling with soil selecting and transporting apparatus according to the present invention.
Figure 6:
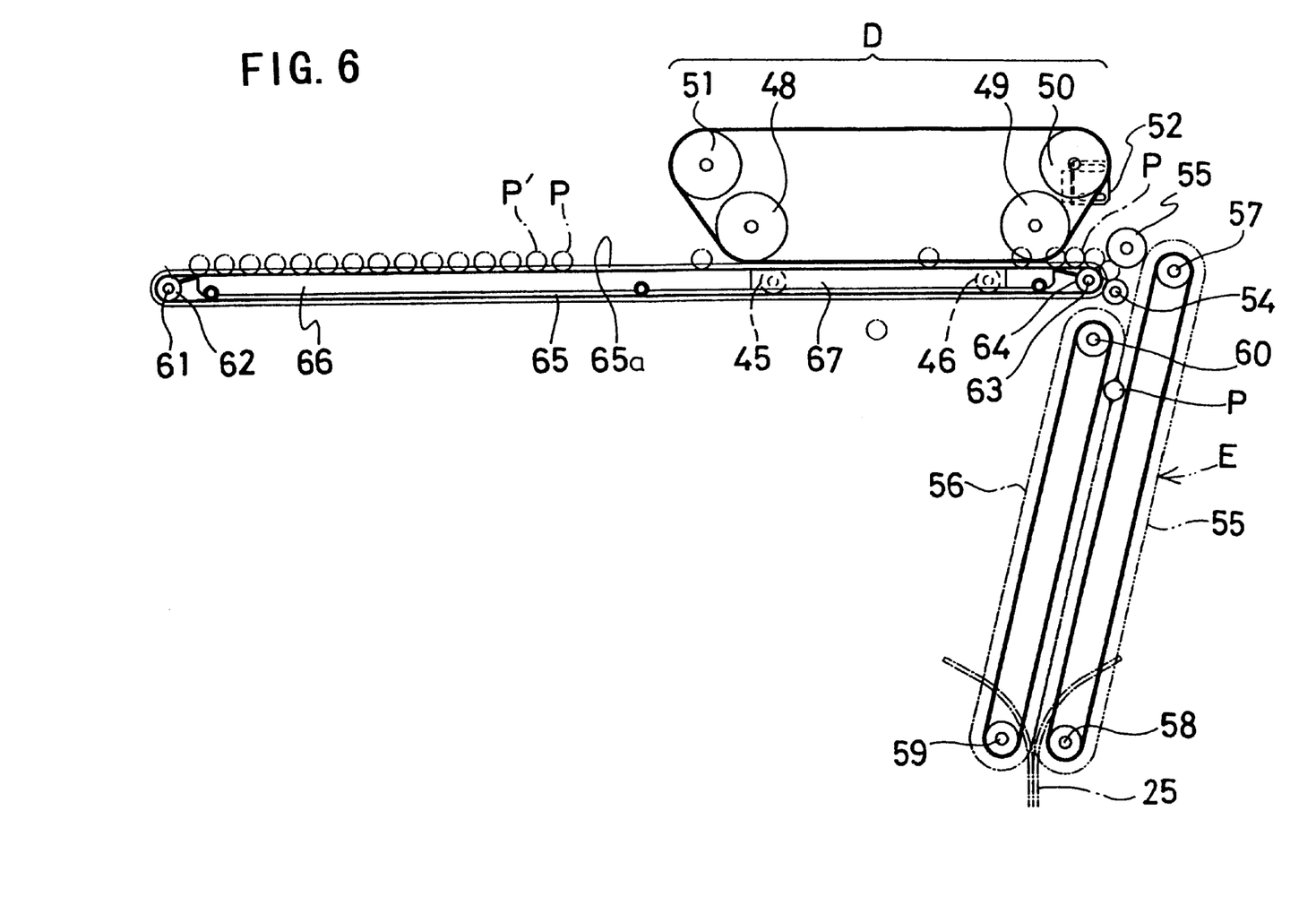
FIG. 6 is an enlarged front elevation of the second embodiment of the seedling with soil selecting and transporting apparatus according to the invention.

Next, discussion will be given hereinafter for a second embodiment of the seedling with soil selecting and transporting apparatus according to the present invention, with reference to FIGS. 5 and 6.

The second embodiment of the seedling with soil selecting and transporting apparatus is constructed by extending the strip form transporting belt 39 of the seedling with soil selecting and transporting conveyer C in the first embodiment, in the direction toward the transportation starting end to use as the strip form supply belt 32 of the seedling supplying conveyer B. In other words, this embodiment is differentiated from the construction of the first embodiment in that the strip form supply belt and the strip form transporting belt are formed as one belt member. Therefore, discussion will be given only for the different portions, and like components to those in the first embodiment will be identified by like reference numerals thereby facilitating a clear understanding of the present invention.

The seedling with soil selecting and transporting conveyer F is constructed by stretching a strip form transporting belt 65 between belt stretching rollers 62 and 64. The strip form transporting belt 65 is made of an elastic material, such as rubber or so forth, for example. Belt stretching roller 62 is mounted on a shaft 61 supported on substantially the same position on a machine frame as the shaft 28 of the strip form supply belt 32 of the seedling supply conveyer B. Similarly stretching roller 64 is mounted on a shaft 63 supported on the same position on the machine frame as the shaft 36 of the strip form transporting belt 39 of the seedling with soil selecting and transporting conveyer C. On the other hand, between the belt stretching rollers 62 and 64, a belt holding plate 66 is arranged below the upper traveling portion 65a of the strip form transporting belt 65 for supporting the upper traveling portion 65a as a flat surface.

The belt holding plate 66 is a plate form member of rectangular shape in plan view. On one side edge 66' is formed a seedling drop down opening 67 of channel shaped configuration in plan view similar to the seedling drop down opening 42.

Between the side edge portions 65' and 65" of the strip form transporting belt 65 is formed a plurality of seedling with soil slip down pieces 68 of the same shape as the seedling with soil slip down pieces 41.

Although the present invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible modifications which can be embodied within the scope of the appended claims.

Namely, in the foregoing embodiments, while the seedling with soil slip down pieces are formed on one of the outer side edge portions of the strip form transporting belt, and are deflected downwardly and obliquely to slip down the seedling with soil, it is possible to form one of the outer edge portions with an elastic member having large expansion ratio so as to only deflect downwardly and obliquely.

In this case, the seedling drop down opening permitting downward deflection is formed on a part of the belt holding plate. On the other hand, a slip down piece supporting roller may be arranged within the seedling drop down opening to assist the downwardly deflected outer edge portion of the slip down piece.

According to the invention, a seedling with soil selecting and transporting apparatus for a transplanting machine, for transporting good seedlings having leaf portions grown into a normal length and no good seedlings having leaf portions not grown into a normal length, includes a strip form transporting belt transporting good and no good seedlings with soil in a fallen sideways orientation and in a condition such that concentrically mounted soil depositing portions are on one outer side edge portion of the transporting belt. Also, a clamping belt clamps leaf portions of good seedlings with soil among the good and no good seedlings mounted on the strip form transporting belt. The strip form transporting belt then has one of its outer side edges deflected downwardly for dropping only no good seedlings having leaf portions not clamped by the clamping belt. In such an apparatus, failure in operation will not be caused even by deposited clumps of earth. Also, even under external vibration or slight disturbances in transporting attitude of the seedling with soil, good seedlings with soil and no good seedlings with soil can be steadily and certainly selected by a device having a simple structure.

Also, in the preferred construction, because a plurality of seedling with soil slip down pieces for mounting the good and no good seedlings are formed on the strip form transporting belt in a given interval, and because the seedling with soil slip down pieces deflect downwardly, the good seedlings with soil and the no good seedlings with soil can be certainly selected.

Also, according to the preferred construction, the seedling with soil slip down pieces are formed such that an end edge of the front side, in the traveling direction of the strip transporting belt, is offset forwardly from an outer end portion of a base end portion. Therefore, the seedling with soil slip down pieces can deflect along the outer periphery of the belt stretching roller, even when the seedling with soil slip down pieces pass the belt stretching roller associated with the strip form transporting belt. Thus, even when other structural members are closely arranged in the vicinity of the belt stretching roller, for compact construction, interference of the strip form transporting belt by the seedling with soil slip down pieces can be successfully avoided.

In the further preferred construction, a belt holding plate is provided for supporting an upper traveling portion of the strip form transporting belt mounting the good and no good seedlings with soil, to be flat, and a seedling drop down opening permitting downward deflection of the seedling with soil slip down piece is formed in a part of the belt holding plate. Thus, the seedling with soil slip down piece can be deflected downwardly with simple construction.

Furthermore, the seedling with soil slip down piece mounting the good and no good seedlings with soil may smoothly vary from the horizontal condition to the downwardly deflected condition and from downwardly deflected condition to the horizontal condition. Therefore, the attitude of the good seedling with soil mounted on the seedling with soil slip down piece is not disturbed.

In the preferred construction, a slip down piece supporting roller, for assisting movement of a downwardly deflected seedling with soil slip down piece on the belt holding plate, is disposed within the seedling drop down opening. Therefore, the seedling with soil slip down piece may smoothly vary in condition from the downwardly deflected condition to the horizontal condition.

According to the preferred construction, a slip down piece supporting roller, for assisting movement of the seedling with soil slip down piece into the seedling drop down opening, is disposed within the seedling drop down opening. Thus, the seedling with soil slip down piece can be smoothly varied in condition from the horizontal condition to the downwardly deflected condition.

According to the preferred construction, a strip form supply belt for supplying the seedling with soil to the strip form transporting belt is provided. Thus, good seedlings with soil can be selected efficiently.

In the preferred construction, the strip form transporting belt and the strip form supply belt are formed by one belt member. Thus, the good and no good seedling with soil can be transferred in stepless fashion to reduce disturbance of the attitude of the good seedlings with soil.

Since the strip form transporting belt is formed of an elastic material, such as rubber or the like, which can be deformed elastically, the seedling with soil slip down piece can be easily formed. Accordingly, production cost can be lowered.

In the preferred embodiment, one outer edge portion of the strip form transporting belt is formed of an elastic material having a large expansion ratio for causing elastic deformation when mounting the good and no good seedlings with soil. The good and no good seedlings with soil can be certainly and steadily selected by forming the seedling with soil slip down piece of simple construction.

With the preferred embodiment, a belt holding plate is provided for supporting, in a flat manner, an upper traveling portion of the strip form transporting belt mounting the good and no good seedlings with soil. A seedling drop down opening permitting downward deflection of one outer side edge portion of the strip form transporting belt is formed in a part of the belt holding plate. Thus, the one outer side edge portion of the strip form transporting belt can be deflected downwardly with simple construction.

Furthermore, the one outer side edge portion of the strip form transporting belt may smoothly vary the attitude from the horizontal condition to the downwardly deflected condition and from the downwardly deflected condition to the horizontal condition. Therefore, the attitude of one of the outer side edge portions of the strip form transporting belt can be smoothly varied from the deflected condition to the horizontal condition.

What is claimed is:

1. A selecting and transporting apparatus for a transplanting machine which transplants seedlings with soil, for transporting good seedlings having leaf portions grown to a predetermined length and no good seedlings having leaf portions not grown to said predetermined length, comprising:

a strip form transporting belt transporting good and no good seedlings with soil in attitude wherein they are fallen sideways and have concentrically mounted soil depositing portions on one outer side edge portion of said strip form transporting belt; and a clamping belt clamping leaf portions of good seedlings with soil among the good and no good seedlings mounted on said strip form transporting belt, said one outer side edge being deflectable downwardly for slipping down only no good seedlings having leaf portions not clamped by said clamping belt.

2. The selecting and transporting apparatus for a transplanting machine as set forth in claim 1, wherein a plurality of seedling with soil slip down pieces for mounting said good and no good seedings, are formed on the strip form transporting belt in a given interval, and said seedling with soil slip down pieces deflect downwardly.

3. The selecting and transporting apparatus for a transplanting machine as set forth in claim 2, wherein said strip form transporting belt travels in a traveling direction and each of said seedling with soil slip down pieces is formed with a front edge, wherein said front edge includes a base end portion and an outer end portion such that said base end portion is offset forward, in said traveling direction, with respect to said base end portion.

4. The selecting and transporting apparatus for a transplanting machine as set forth in claim 2, further comprising a belt holding plate supporting an upper traveling portion of said strip form transporting belt such that said upper traveling portion is flat, said belt holding plate further including a seedling drop down opening permitting downward deflection of said seedling with soil slip down pieces.

5. The selecting and transporting apparatus for a transplanting machine as set forth in claim 4, further comprising a slip down piece supporting roller assisting movement of downwardly deflected seedling with soil slip down pieces, wherein said supporting roller is disposed within said seedling drop down opening.

6. The selecting and transporting apparatus for a transplanting machine as set forth in claim 5, wherein said supporting roller is disposed on one end of said seedling drop down opening.

7. The selecting and transporting apparatus for a transplanting machine as set forth in claim 6, further comprising a second supporting roller disposed on an end of said seedling drop down opening opposite that of said supporting roller.

8. The selecting and transporting apparatus for a transplanting machine as set forth in claim 4, further comprising a slip down piece supporting roller assisting movement of said seedling with soil slip down pieces as said seedling with soil slip down pieces move into said seeding drop down opening, wherein said supporting roller is disposed within the seedling drop down opening.

9. The selecting and transporting apparatus for a transplanting machine as set forth in claim 8, wherein said supporting roller is disposed on one end of said seedling drop down opening.

10. The selecting and transporting apparatus for a transplanting machine as set forth in claim 9, further comprising a second supporting roller disposed on an end of said seedling drop down opening opposite that of said supporting roller.

11. The selecting and transporting apparatus for a transplanting machine as set forth in claim 1, which further comprises a strip form supply belt for supplying the seedlings with soil to said strip form transporting belt.

12. The selecting and transporting apparatus for a transplanting machine as set forth in claim 11, wherein said strip form transporting belt and said strip form supply belt are formed by one belt member.

13. The selecting and transporting apparatus for a transplanting machine as set forth in claim 1, wherein said strip form transporting belt is formed of an elastic material which can be deformed elastically.

14. The selecting and transporting apparatus for a transplanting machine as set forth in claim 13, wherein said elastic material is rubber.

15. The selecting and transporting apparatus for a transplanting machine as set forth in claim 1, wherein one outer edge portion of said strip form transporting belt is formed of an elastic material having a large expansion ratio such that elastic deformation is not caused by its own weight.

16. The selecting and transporting apparatus for a transplanting machine as set forth in claim 15, which further comprises a belt holding plate supporting an upper traveling portion of said strip form transporting belt such that said upper traveling portion is flat, said belt holding plate further including a seedling drop down opening permitting downward deflection of said one outer edge portion having a large expansion ratio.

17. The selecting and transporting apparatus for a transplanting machine as set forth in claim 16, which further comprises an outer belt edge supporting roller assisting movement of said one outer edge portion when said one outer edge portion is downwardly deflected and is disposed within said seedling drop down opening.

18. A selecting and transporting apparatus for a transplanting machine which transplants seedlings with soil, for transporting good seedlings having leaf portions grown to a predetermined length and no good seedlings having leaf portions not grown to said predetermined length, comprising:

a strip form supply belt for supplying seedlings with soil;

a strip form transporting belt for receiving seedlings with soil from said strip form supply belt and transporting good and no good seedlings with soil in an attitude wherein they are fallen sideways and have concentrically mounted soil depositing portions on one outer side edge portion of said strip form transporting belt; and a clamping belt for clamping leaf portions of good seedlings with soil among the good and no good seedlings mounted on said strip form transporting belt, said one outer side edge being deflected downwardly for slipping down only no good seedlings having leaf portions not clamped by said clamping belt.

19. The selecting and transporting apparatus for a transplanting machine as set forth in claim 18, wherein a plurality of seedling with soil slip down pieces, for mounting said good and no good seedlings are formed on the strip form transporting belt in a given interval, and said seedling with soil slip down pieces deflect downwardly.

20. The selecting and transporting apparatus for a transplanting machine as set forth in claim 19, wherein said strip form transporting belt travels in a traveling direction and each of said seedling with soil slip down pieces is formed with a front edge, wherein said front edge includes a base end portion and an outer end portion such that said base end portion is offset forward, in said traveling direction, with respect to said base end portion.

21. The selecting and transporting apparatus for a transplanting machine as set forth in claim 20, further comprising a slip down piece supporting roller assisting movement of downwardly deflected seedling with soil slip down pieces, wherein said supporting roller is disposed within said seedling drop down opening.

22. The selecting and transporting apparatus for a transplanting machine as set forth in claim 20, further comprising a slip down piece supporting roller assisting movement of said seedling with soil slip down pieces as said seedling with said soil slip down pieces move into said seeding drop down opening, wherein said supporting roller is disposed within the seedling drop down opening.

23. The selecting and transporting apparatus for a transplanting machine as set forth in claim 22, wherein said strip form transporting belt and said strip form supply belt are formed by one belt member.

24. The selecting and transporting apparatus for a transplanting machine as set forth in claim 19, further comprising a belt holding plate supporting an upper traveling portion of said strip form transporting belt such that said upper traveling portion is flat, said belt holding plate further including a seedling drop down opening permitting downward deflection of said seedling with soil slip down pieces.

25. The selecting and transporting apparatus for a transplanting machine as set forth in claim 18, wherein said strip form transporting belt is formed of an elastic material which can be deformed elastically.

26. The selecting and transporting apparatus for a transplanting machine as set forth in claim 25, wherein said elastic material is rubber.

27. The selecting and transporting apparatus for a transplanting machine as set forth in claim 18, wherein one outer edge portion of said strip form transporting belt is formed of an elastic material having a large expansion ratio such that elastic deformation is not caused by its own weight.

* * * * *